Figure 7:
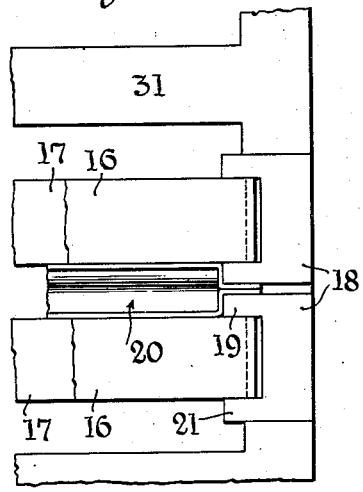

June 20, 1939.  L. C. BAUMGARTEN  2,162,832
VALVE
Filed May 20, 1937  3 Sheets-Sheet 1
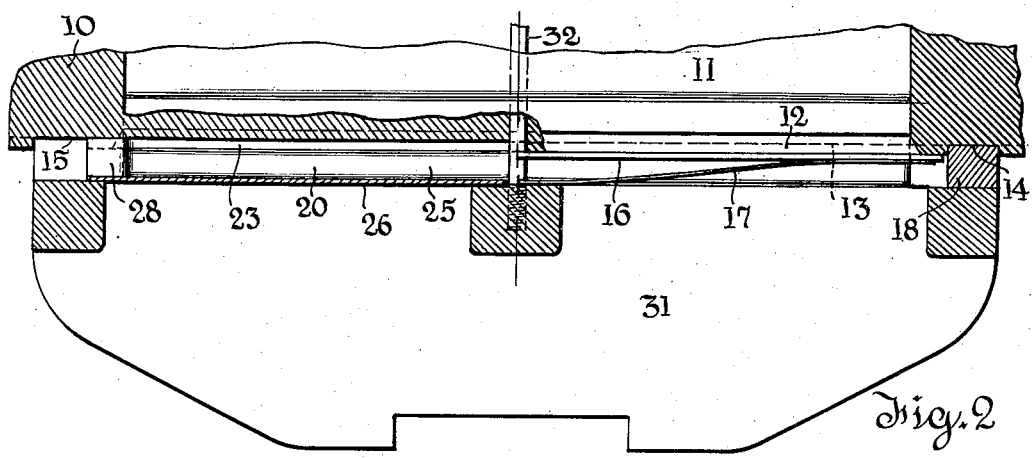
Fig. 2
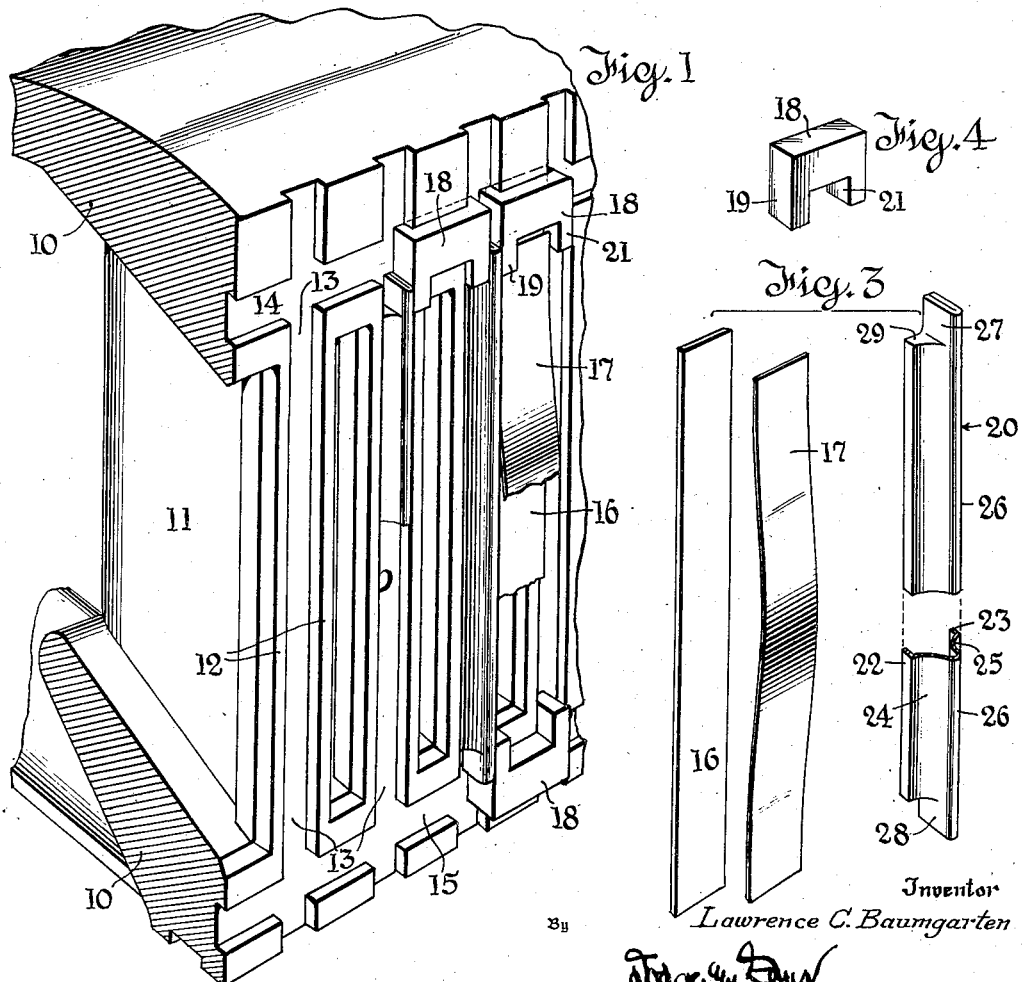
Fig. 1
Fig. 4
Fig. 3
Inventor
Lawrence C. Baumgarten
By
Attorneys.

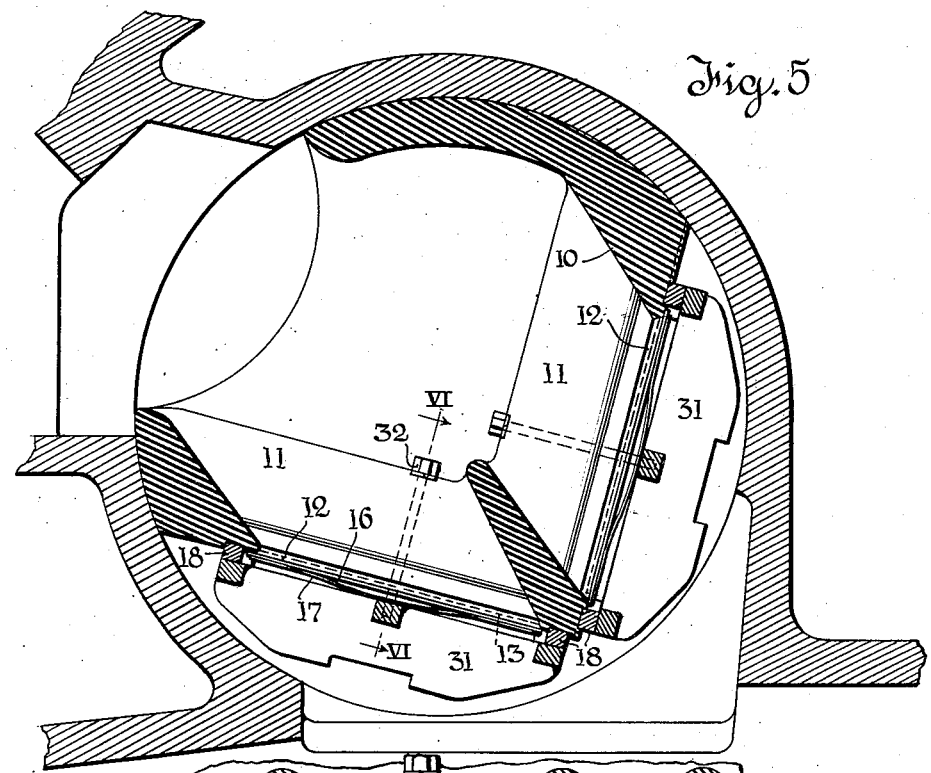
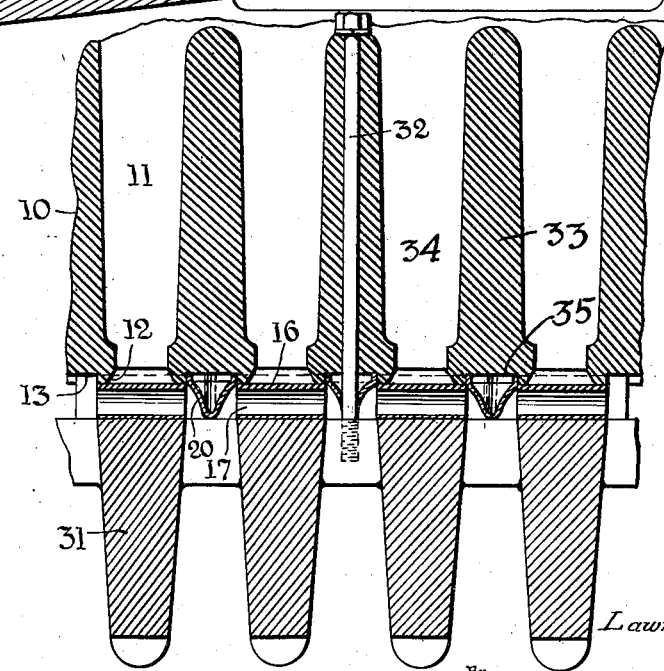

June 20, 1939.  L. C. BAUMGARTEN  2,162,832
VALVE
Filed May 20, 1937   3 Sheets-Sheet 3

Inventor
Lawrence C. Baumgarten
By Dodge and Sons
Attorneys

Patented June 20, 1939

2,162,832

UNITED STATES PATENT OFFICE 2,162,832

VALVE

Lawrence C. Baumgarten, Hornell, N. Y., assignor to Nordberg Manufacturing Company, Milwaukee, Wis., a corporation of Wisconsin Application May 20, 1937, Serial No. 143,822

9 Claims. (Cl. 277—60)

This invention pertains to valves, and more particularly to valves designed for use in connection with blowing engines, compressors, and the like.

Generally considered, valves of the type herein shown and described are old, as is shown in Letters Patent to Bruno Nordberg, No. 1,400,373 of December 13, 1921, and No. 1,570,392 of January 19, 1926.

Valves such as set forth and claimed in the above mentioned Letters Patent have been extensively used for air compressors, but so far as I am aware have not been utilized to any considerable extent in blowing engine, due to occurring losses.

The losses in any valve are due primarily (first) to restricted passages calling for high velocities, and (second) to change in direction of flow. Of the two, the losses occurring from restricted openings are the greater, and in ordinary compressor work it is sufficient to have merely area enough through the valves to decrease the loss to an appreciable minimum. When, however, discharge pressure of only a few pounds per square inch above atmosphere are to be obtained by a blowing engine, the losses cannot be reduced to an appreciable minimum by variation in the valve area alone.

It also follows that it is difficult and expensive to reduce the air velocity below 4000 feet per minute, hence under ordinary conditions in utilizing plate valves of the type set forth in the patents above specified, it would be necessary to employ large valve castings and a greater number of valves which, of course, adds to the cost of production and maintenance.

The type of valve above mentioned has, in addition to the disadvantages above specified, the objectionable characteristic of causing a shriek or whistling sound of very high pitch. In a blowing engine this becomes particularly objectionable as the number of valves is very large and the combined value of the shriek or whistling is very penetrating, especially through the thin walls of the rather light receivers and discharge pipes usually employed in connection therewith.

The main object of the present invention is to provide an improved valve mounting which, in addition to facilitating the assembly and maintenance of the valve and allied elements in proper relation, also serves to regulate and control the flow or air through the valve structure in such manner as to minimize the shriek or whistling above mentioned.

Figure 9:
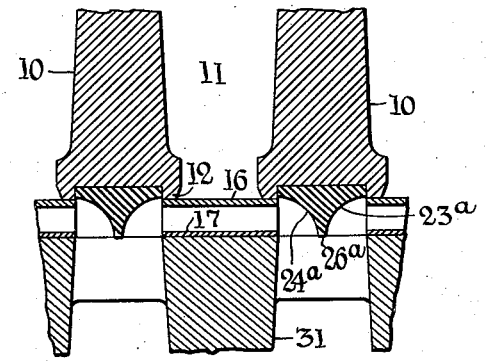
Figure 8:
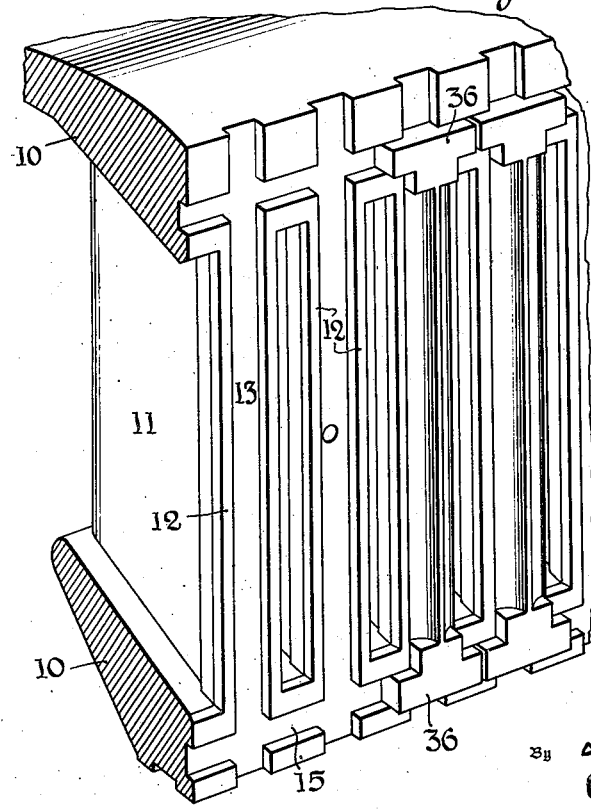
Figure 10:
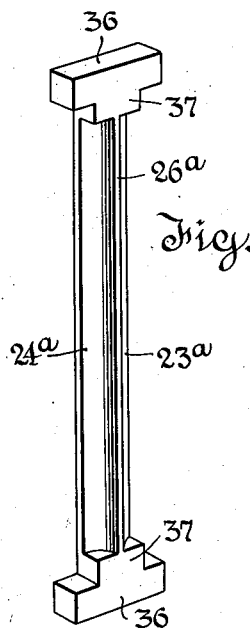

Two forms or embodiments of the invention are disclosed in the annexed drawings, wherein:

Figure 1 is a perspective view of so much of a valve assembly as is necessary to an understanding of the structure and illustrative of one form of the invention;

Fig. 2, a sectional view, the line of section being longitudinal of the valve opening, with parts broken away and other parts in section;

Fig. 3, a perspective view of one of the plate valves, its closing or seating spring and the air current deflector which is employed in conjunction with proximate valves to control the direction of flow of said currents;

Fig. 4, a perspective view of a spacer block for holding the parts just referred to in position with reference to each other and to the valve seats;

Fig. 5, a transverse sectional view of the valve mechanism shown as mounted in a fixed portion of a blowing engine or compressor;

Fig. 6, a transverse sectional view on the line VI—VI of Fig. 5;

Fig. 7, a face view of the end portions of two valves and their allied elements, and designed more especially to illustrate the relative positioning and relation of the parts;

Fig. 8, a perspective view of a portion of a valve seat casting with two combined valve positioning and air current or air flow directing means of a modified form, the valves and their springs being omitted;

Fig. 9, a transverse sectional view showing two plate valves, their springs, the current directing means and allied parts, the valves being shown as closed on the seats; and Fig. 10, a perspective view of the combined or modified form of valve positioning means and air current flow directing means.

Referring first to Figs. 1 to 7, inclusive, 10 denotes a valve body having ports 11 extending therethrough, said ports terminating at one end in raised and elongated valve seats 12 rectangular in outline. Said seats are formed or defined by grooves or channels 13 formed in the face of the body 10 to each side and intermediate of the ports 11, while parallel grooves or channels 14 and 15, likewise formed in the face of the body, define the end portions of the raised seats.

The grooves 13 are shown as extending entirely across the face of the body 10, but they could, of course, be stopped short so as to terminate at the outer walls or faces of the grooves 14 and 15 which stand at right angles thereto.

The valves are denoted by 16 and are of the plate type, preferably produced from high grade spring steel. The overlying bowed spring employed to normally move the valve back to its seat is denoted by 17 and has the same general elongated rectangular form as has the valve 16 and rests directly thereon at all times.

In order to position the elements 16 and 17 and to maintain them in proper relationship to each other and the valve seat at all times and under all conditions, guide and positioning blocks denoted generally by 18 are mounted in the grooves 14 and 15. Each block is formed with two parallel inwardly extending legs 19 and 21 which, when the blocks are seated, pass inwardly of the grooves 13 to each side of the wall of the upstanding seat 12. The main body of the block 18 and the legs 19 and 21 produce guides which prevent undue endwise or sidewise shifting of the valve 16 with reference to the seat 12 as it is moved toward and from the same.

It will be appreciated that a plurality of valve seats and valves are employed in structures such as herein referred to, and as a consequence, as the valves are moved off their seats under the force of compressed air, air currents will pass outwardly to each side of each valve and be thrown into conflict with similar, reversely flowing air currents passing outwardly from adjacent valves. It is apparently this impact of the air currents upon each other under the patented arrangement that sets up in the apparatus the shriek such as above mentioned.

I have found that by employing a deflector to each side of each valve, which deflectors control the direction and flow of the air currents passing outwardly from the edges of the valve, the shriek may be reduced to a minimum. To this end, I may employ a structure such as shown in detail in Fig. 3. It is denoted generally by 20 and comprises an elongated member preferably produced from sheet metal bent to form, the body portion whereof is provided with relatively narrow oppositely disposed flat faces 22 and 23, from each of which there extends a concave face 24 and 25, respectively, such faces merging at the outer portion of the member as at 26. The ends of the body are flattened as at 27 and 28 and the legs 19 and 21 of the block 18 are so proportioned that when the parts are assembled the outer faces of the legs of adjacent blocks will closely embrace the opposite faces of the flattened end section 27 and 28 with the end of each leg bearing against a shouldered portion 29 formed at the base of the flattened portion and the body of the member.

Overlying the valves and their associated elements is a valve guard denoted generally by 31, see more particularly Figs. 2, 5 and 6, said guard being secured to the body 10 by suitable cap screws 32, one of which is shown in Fig. 2. When the guard is secured in place, it contacts the blocks 18 and the end portions of the edge 26 of the deflectors thus securing the various parts in position.

Those current deflectors which stand in line with the cap screws as they are positioned must, of necessity, have an opening formed therethrough for the positioning of the cap screws, and in Fig. 2 such an arrangement is shown. To the right hand side of the cap screw in said figure the valve, its spring and the current deflector are shown in full lines; whereas, to the left in said figure, the valve and its spring are omitted and the current deflector is shown in section. Reference is also made to Fig. 6 in this regard, and as will be seen upon reference to said figure, the elements 33 which form passages 34 therebetween are each at their inner face grooved out or formed with a channel as 35 to receive the edges and the flat parallel faces 22 and 23 of the air deflectors. This arrangement also serves to properly position the air current deflectors and to preclude movement or chattering of the parts with reference to each other and insures proper functioning of the current deflectors.

As will be seen upon reference to Fig. 6, the members 31 taper toward their outer ends, producing discharge passages or conduits of gradually increasing area. Moreover, the faces thereof are flat throughout, forming channels in which there is nothing present to set up eddy currents.

Deflectors formed of sheet metal as above described are preferred, but with a view of accomplishing the same end, I may employ a single element which acts as a current deflector as well as a positioning means comparable to the block 18 and its legs 19 and 21. In this connection, reference is had to Figs. 8, 9 and 10. Here, the element 10 is provided with the seats 12 heretofore referred to, the parallel grooves 13 extending along each side of the raised valve seat and the transversely extending grooves 14 and 15 extending along the ends of the valve seat. In effect, the grooves 13, 14 and 15 produce or define the upstanding valve seat 12. In this instance, the valve and the springs are the same as indicated in Fig. 9 and are so lettered, as is the valve guard 31.

The combined valve and spring positioning guide vane or element and the current deflector are shown in Fig. 10. It may be said to comprise a body portion having concave sides 23ᵃ and 24ᵃ which merge at their outer face as at 26ᵃ. At each end of the body proper there is formed a crosshead, the main body portion 36 whereof when the parts are assembled, lies within the grooves 14 and 15. Extending inwardly from the crosshead 36 is a squared portion 37 the side walls whereof contact the side walls of the upstanding valve seat 12 adjacent the outer portion thereof, while the body portion having the concave faces 23ᵃ and 24ᵃ lies within the groove 13 between the members or portions 37 and serves to deflect the air currents which are passed outwardly from beneath the valves in the same manner as do the faces 23 and 24 of the deflector heretofore referred to.

The blocks 18 and their integrally produced legs 19 and 21 and the cross blocks or heads 36 will preferably be hardened to withstand wear, and can be made either higher or lower to obtain the desired results.

As will be seen upon reference to the various views and more particularly Figs. 6 and 7, there is no obstruction in the flow of air outwardly from under the valve as the valve rises from its seat. Furthermore, there are no pockets so as to cause eddy currents and other losses.

It has been found in actual practice that the presence of the air current deflectors cuts down the shriek to a very great extent. Moreover, the direction of flow is positively determined and losses are thereby cut down. This is particularly true where the valve structures are employed in connection with blowing engines when discharge pressures of only a few pounds per square inch above atmosphere are to be obtained. Such losses cannot be reduced to an appreciable minimum by change in the valve area alone.

The use of the light weight plate or strip valves renders the structure sensitive in operation and under certain conditions the springs may be omitted. By the employment of the deflectors as described, or the mechanical equivalent thereof, the air or gas streams which pass outwardly from beneath adjacent valves when they are lifted from their seats, are precluded from coming into direct contact in opposing directions of flow, but, on the other hand, are caused to gradually change their direction of flow from a lateral one to one at substantially right angles to the valve, finally merging with each other while travelling or moving in the same direction. This action takes place by reason of the formation of the deflectors and their location. The apex of each deflector extends to a point or line beyond any which the valves may assume in their fully opened positions. In other words the apex 26 of the deflector of Figs. 2 and 3, or the apex 26a of the deflector of Fig. 10, extends at least into line with the face of the guard element 31. By having the air streams first contact concave and unbroken surfaces before the streams can possibly contact or merge, the formation of eddy currents is precluded and the streams, prior to and after confluence, flow on without obstruction.

What is claimed is:

1. In a valve the combination of a body element having a plurality of ports extending therethrough; a valve seat for each port, said seats being defined by a series of grooves extending across the face of the body element, and two transversely arranged grooves into which the first named grooves extend; a plate valve for each valve seat; a deflector seated within the face grooves and presenting on each side adjacent the ports a concave surface, said surfaces merging into each other; a ported valve guard, the ports whereof stand in staggered relation to the valve seats and in alignment with the line of mergence of the concave surfaces of the deflector; and means for securing the guard to the body.

2. A valve as set forth in claim 1, wherein the deflector comprises a head portion at each end thereof, with an intermediate member forming the concave surfaces, said head members being seated in the last named grooves.

3. A structure as set forth in claim 1, wherein the deflector comprises a body element having concave sides, with a head element at each end thereof fitting within the transverse grooves, whereby the deflector is positioned with reference to the valve seats.

4. A structure as set forth in claim 1, wherein the deflector is produced from sheet metal bent to form and presenting oppositely disposed concave faces extending throughout the length of the body thereof, with the ends of the deflector flattened, together with blocks having a head portion seated within the transverse grooves, and inwardly projecting legs, the outer faces whereof contact and embrace the adjacent flattened faces of the deflector.

5. In a valve, the combination of a body element having a plurality of ports extending therethrough; a valve seat for each port; a valve guard overlying and secured to the body member, said guard having ports extending therethrough and opening intermediate the valve seats; a deflector for the air streams passing from beneath the valves when the same are lifted from their seats by a gaseous medium under pressure, said deflector comprising a body element having concave sides merging into each other toward the discharge opening in the guard member, the ends of said deflector being flattened; and means embracing said flattened ends and contacting the adjacent face of the guard, whereby the deflector is held in position with reference to the valve seats.

6. A plate valve structure comprising a valve seat member having a plurality of elongated gas discharge ports in parallel relation to one another and raised margins around said ports defining grooves between said ports; a valve overlying each port and normally closing the same; a valve guard mounted on said seat member, said guard having gas discharge openings therein located one between each two adjacent ports in said seat member, and said openings diverging away from said ports and affording non-eddying discharge paths for discharging gas; a plurality of removable gas deflectors comprising members separate from said seat member and said guard, one mounted in each of said grooves and presenting two converging gas deflecting surfaces to said discharge ports, each of said surfaces being arranged to deflect gas from one of said ports; and means carried by said deflectors outside of the margins of said ports for cooperation with said guard to hold said deflectors in position.

7. In a plate valve structure of the type comprising a body element containing ports, plate valves for opening and closing said ports, and a ported guard having its ports in staggered relation to the ports in said body element, and serving to hold said valves in operative relation to said body element, a gas deflector comprising an elongated body having a seating face, a pair of concave faces in converging relation to each other and extending away from said seating face, and extended securing means formed integrally with said body at each end thereof, said deflector being adapted to be mounted on said body element between two of its ports and to extend into one of the ports in said guard and to be held in position by engagement with said body element and said guard.

8. In a plate valve structure of the type comprising a body element containing ports, plate valves for opening and closing said ports, and a ported guard having its ports in staggered relation to the ports in said body element, and serving to hold said valves in operative relation to said body element, a gas deflector comprising an elongated hollow sheet metal body having a central line of mergence extending throughout its length with a concave face on either side of said line and diverging away from said line to form a seating face made up of two spaced portions, and a pair of securing sections one at either end of said line and each composed of two flattened integral portions of said metal extending parallel to said line and substantially perpendicular to the plane of said seating face, said deflector being adapted to be mounted on said body element between two of its ports and to extend into one of the ports in said guard and to be held in position by engagement with said body element and said guard.

9. In a plate valve structure of the type comprising a body element containing ports, plate valves for opening and closing said ports, and a ported guard having its ports in staggered relation to the ports in said body element, and serving to hold said valves in operative relation to said body element, a gas deflector comprising an elongated metal block having a substantially flat rear seating surface and a pair of concave deflecting surfaces extending away from said seating surface and merging into each other, and a substantially T-shaped integral enlargement at each end of the block and having a seating surface formed as a continuation of that of said block, said deflector being adapted to be mounted on said body element between two of its ports and to extend into one of the ports in said guard and to be held in position by engagement with said body element and said guard.

LAWRENCE C. BAUMGARTEN.